Aug. 2, 1955     C. E. DRAKE     2,714,317
METHOD OF AFFIXING CARBIDE AND DENSE ALLOY TIPS TO SAWS
Filed May 18, 1950

INVENTOR.
CLAUD E. DRAKE
BY *Alfred W. Petchaft*
ATTORNEY

United States Patent Office 2,714,317
Patented Aug. 2, 1955

2,714,317

METHOD OF AFFIXING CARBIDE AND DENSE ALLOY TIPS TO SAWS

Claud E. Drake, Brentwood, Mo.

Application May 18, 1950, Serial No. 162,625

1 Claim. (Cl. 76—112)

This invention relates in general to certain new and useful improvements in carbide and dense alloy tips for saws and methods of affixing same.

The primary object of this invention is to provide carbide or dense alloy tips for saws which can be readily affixed in saw teeth and which are designed to present an improved cutting surface.

It is a further object of the present invention to provide carbide and dense alloy tips for saws which, in use, make smooth finished cuts thereby eliminating necessity of further finishing operation.

It is an additional object of the present invention to provide a unique method for affixing carbide and dense alloy tips in saws which method is simple, accurate, and rapid, making possible material savings in labor and other related costs as compared with conventional saw-tipping methods.

With the above and other objects in view, my invention resides in the novel features of form, construction, arrangement, and combination of parts presently described and pointed out in the claim.

In the accompanying drawing—

Figure 1:
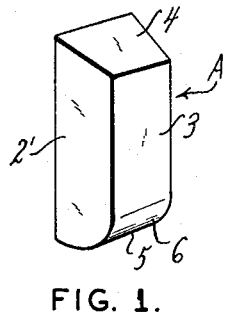
Figure 1 is a perspective view of a saw tip constructed in accordance with and embodying the present invention.
Figure 2:
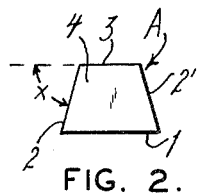
Figure 2 is a top plan view of the saw tip.
Figure 3:
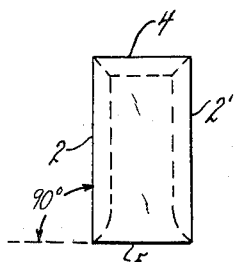
Figure 3 is a front view of the saw tip.

In broadest outline the present invention resides in the provision of uniquely engineered, preformed tip member formed of carbide or some suitable dense alloy and having a precisely designed shape for use with saw teeth and in the method of securing said tip member within the saw teeth in a predetermined position which method incorporates the use of a jig and pressure finger or equivalent positioning means.

Referring now in more detail and by reference characters to the drawing which illustrates a preferred embodiment of the present invention, A designates a tip member fabricated preferably of cemented carbide or other dense alloy having a forward or cutting face 1, lateral, rearwardly inclined or side faces 2, 2', a rearward surface or back face 3 parallel to, and narrower than, the forward face 1, a rearwardly and downwardly inclined top surface or rake face 4 and a bottom face 5 which at its forward edge is in parallel relation to the forward edge of the top surface 4 and in its rearward portion is arcuate, as at 6, for blending into the rear surface 2.

Figure 4:
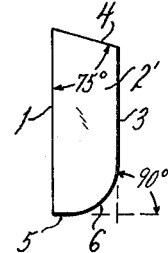
Figure 4 is a side elevational view of the saw tip.
Figure 5:
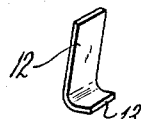
Figure 5 is a perspective view of a section of silver solder formed in a manner suitable for use in conjunction with the present invention.
Figure 6:
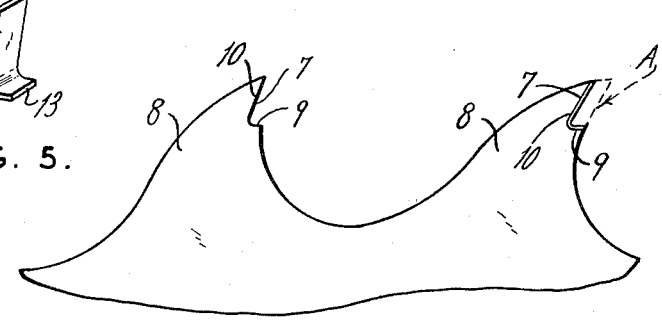
Figure 6 is a fragmentary elevational view of a saw-blade illustrating the initial steps in tipping the saw in accordance with the present invention.
Figure 9:
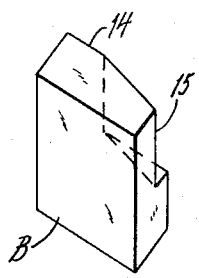
Figure 9 is a perspective view of the jig member utilized in applying the tip to the saw.
Figure 7:
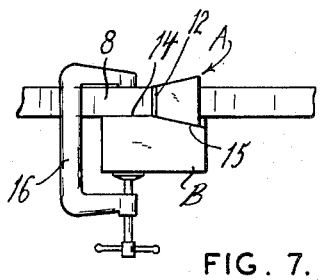
Figures 7 and 8 are fragmentary views showing a tip as held in place by means of a jig member and pressure finger ready for application of brazing heat.

The tip member A is proportioned so that the width of the rearward surface 3 is equivalent to the width of the saw tooth with which the tip member A is to be used, as will be shown hereinafter. The top surface 4 forms a dihedral angle of substantially 75° with the forward face 1, as indicated in Figure 4, wherefore, the dihedral angle formed by the forward portion of the bottom face 5 and the forward face 1 is substantially 90°. The angle $x$ is in no way critical and is determined solely by the guage of the saw, the thickness of the tip member, and the width of the forward face 1.

The tip A is designed for disposition within a recess 7 provided, as by suitable punching or grinding operation, in the cutting face of a saw tooth 8, which may be of any type. Said recess 7 comprises a transversely extending bottom wall 9 and a vertical wall 10 inclined at an appropriate angle to the bottom 9 so that, when the tip member A is inserted therein, the forward and top surfaces 1, 4, respectively, will project only slightly beyond the corresponding adjacent portions of the saw tooth 8. Thus, the required amount of material removal, in order to bring the tip into precise conformity with the desired tooth pattern, will be held to an absolute minimum.

Figure 8:
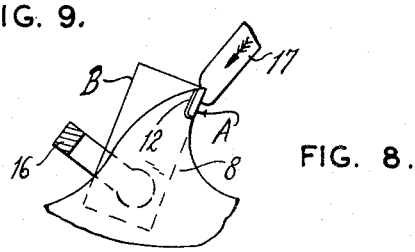

Provided for disposition within the recess 7 is an insert of silver-solder, preferably preformed from a suitable length of ribbon having an upstanding portion 12 and an upwardly curved lower portion 13 in the formation of an inner face designed for snug-fitting surface abutment against the face 3 and arcuate portion 6 of the tip A. Also provided for use with the tip member A is a jig member B having a precisely machined reference face 14 and a tip-positioning recess 15 such that when the reference face 14 is placed flatwise against one face of the saw tooth with the margins of the recess 15 in registration with the tooth recess 7, the tip member A and silver-solder insert 11, suitably coated with a conventional flux, may be placed in the pocket thus formed and will be precisely positioned and aligned for brazing. The jig B may be held in such position by a clamp 16, and a notched pressure finger 17 is brought to bear upon the tip member A, force being applied in the direction indicated by the arrow, as best seen in Figure 8, so as to force the tip A down into the recess 7 and against the body of the saw tooth 8 as the braze is being made. With the tip held thus heat is applied in any conventional or suitable manner, as by oxyhydrogen torch, for example, to fuse the silver-solder insert 11 between the tip member A and the saw tooth 8. After each saw tooth has been tipped in this manner the clamp 16 and jig 8 may be removed and the entire operation repeated for each successive saw tooth around the entire periphery of the blade. Thereafter the tip members A may be ground over the top surface 4 by any conventional method to bring them into the conformity with the desired tooth contour or pattern.

It will thus be seen that by the use of preformed tips A it is necessary to remove only a minimum amount of tip material in the grinding step which materially reduces labor costs. In addition, by the present method it is possible to employ tip designs such that the tip is "backed-up" so to speak, to the optimum degree by the steel of the blade itself imparting to the tips an unusually high degree of impact strength. Finally, the present method makes it possible to braze tips into a saw tooth quickly and accurately with a minimum application of heat and with the heat very closely confined to the immediate area of the braze so that the temper and tension of the blade will not be materially affected.

It should be understood that changes and modifications in the form, construction, arrangement, and combination of the several parts of carbide and dense alloy tips for saws and in the steps of production, may be made and substituted for those herein shown and described, without departing from the nature and principle of my invention.

Having thus described my invention what I now claim and desire to secure by Letters Patent is:

A method of affixing carbide tips on saw teeth which comprises forming a rounded notch-like recess in the front edge of each tooth, providing a strip of solder of the configuration of the inner face of the recess and inserting same tightly against the face of said recess, providing a tip shaped along its rear and bottom faces to fit the recess and having an enlarged forward cutting surface connected to said rear surface by inclined side faces, said forward surface being wider than the saw blade so that when the tip is centered in the recess lateral portions adjacent the cutting surface will overhang beyond the side faces of the saw blade, preparing the rearward portions of the tip and the exposed face of the strip of solder for mutual adherence, clamping a jig having a lateral recess with an inclined inner face upon a side face of the saw blade with its lateral recess aligned with a saw tooth recess, positioning the tip in the recess of the saw tooth and in the lateral recess in the jig with an inclined side face of the tip in face-to-face engagement with the inclined inner face of the lateral recess in the jig, applying heat to the saw tooth adjacent the intermediate area of bond between the tip and tooth to soften said strip of solder, applying pressure to the tip to move said tip along said inclined face of said jig toward the walls of the recess in the tooth, and removing said heat from the saw tooth to allow the solder to harden and secure the tip in place.

References Cited in the file of this patent

UNITED STATES PATENTS

| | | |
|---|---|---|
| 1,755,717 | Wagner | Apr. 22, 1930 |
| 1,837,344 | Stauber | Dec. 22, 1931 |
| 1,842,789 | Langenbach | Jan. 26, 1932 |
| 1,861,218 | Huther | May 31, 1932 |
| 1,887,372 | Emmons | Nov. 8, 1932 |
| 1,887,373 | Emmons et al. | Nov. 8, 1932 |
| 1,948,489 | Balke | Feb. 27, 1934 |
| 1,951,856 | Balke | Mar. 20, 1934 |
| 2,019,934 | Schroter | Nov. 5, 1935 |
| 2,068,848 | De Bats | Jan. 26, 1937 |
| 2,124,438 | Struk et al. | July 19, 1938 |
| 2,384,204 | St. Clair | Sept. 4, 1945 |
| 2,474,643 | Webb | June 28, 1949 |
| 2,528,226 | Hildebrant | Oct. 31, 1950 |

FOREIGN PATENTS

| | | |
|---|---|---|
| 797,394 | France | Feb. 8, 1936 |